Aug. 22, 1944.   H. GASS   2,356,310
CLUTCH DIAPHRAGM SPRING
Filed Aug. 30, 1943
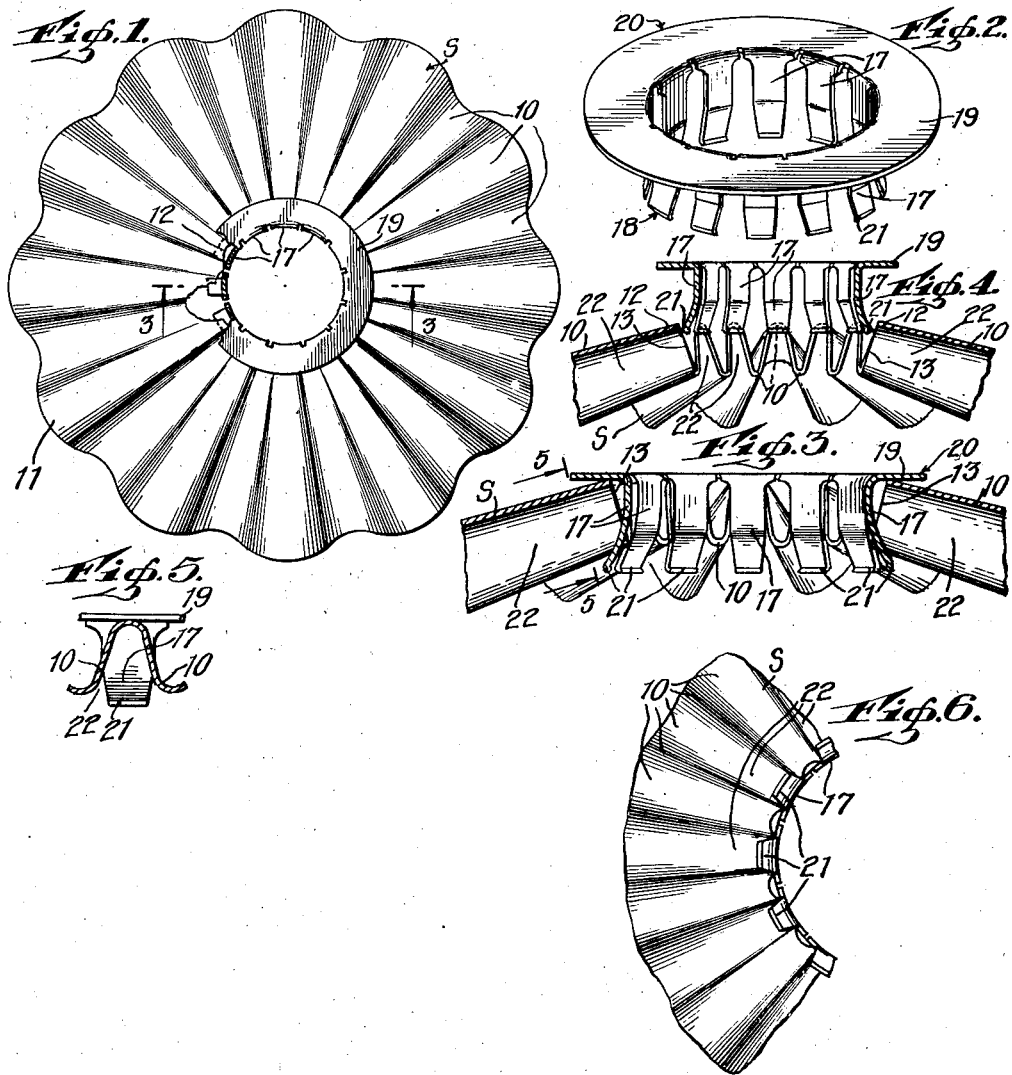
INVENTOR
BY
ATTORNEY Patented Aug. 22, 1944

2,356,310

UNITED STATES PATENT OFFICE 2,356,310

CLUTCH DIAPHRAGM SPRING

Harold Gass, New York, N. Y.

Application August 30, 1943, Serial No. 500,597

9 Claims. (Cl. 267—1)

The invention has to do with clutch diaphragm springs particularly of the hollow frusto conical type wherein a plurality of spaced and radially extending ribs during clutching operations are forcibly and directly acted upon for operatively tensioning and flexing the body of the diaphragm spring as desired. In practice these ribs undergo relatively great wear, thus appreciably shortening the life of the diaphragm spring. Accordingly the object of the invention contemplates the utilization of clutch diaphragm springs of the type alluded to in the matter of providing on such springs a force receiving and transmitting take up collar or thrust bearing appropriately mounted and sustained in the contracted part of a diaphragm spring. The invention has a further object the provision of a take up collar comprising a force receiving and transmitting flange having a depending but interrupted substantially annular series of spaced and resilient reflexed lugs adapted to be pressed and snapped into and through the concentrically arranged contracted opening of each diaphragm spring. A further object resides in interlocking the lugs of the depending series of the thrust bearing with the spaced ribs of the diaphragm spring to prevent rotation of the thrust bearing relative to diaphragm spring. Further objects, advantages, and features of the invention will appear from the following detailed description considered with the accompanying drawing wherein:

Fig. 1 is a plan and broken view of one form of clutch diaphragm spring showing the take up collar or thrust bearing mounted in the contracted portion of the dished diaphragm spring.

Fig. 2 is a perspective view of the take up collar.

Fig. 3 is a sectional view on the line 3—3 of Fig. 1, illustrating the thrust bearing interlocked with the diaphragm spring.

Fig. 4 is a view similar to Fig. 3 on a smaller scale, showing the thrust bearing or collar outside of the contracted opening of the diaphragm spring and ready to be snapped into this opening.

Fig. 5 is a transverse sectional view on the line 5—5 of Fig. 3, and

Fig. 6 is a fragmentary underneath view of Fig. 1.

In the drawing, the diaphragm spring S in each of the embodiments disclosed, is of sheet metal, hollow and frusto conical and as shown in Figs. 1, 3–6 comprises a plurality of spaced and tapered or flared radially extending hollow ribs 10 presenting an undulatory or sinuous surface with the widest portions of the ribs disposed along the perimeter 11 of the body of the diaphragm spring while the narrow portions thereof are along the contracted portion 12 at the other end, defining a concentrically disposed tapered thrust receiving bearing opening 13.

In the embodiment disclosed the contracted opening 13 of course is tapered as shown and the wall thereof is utilized to initially and slightly compress the spaced resilient tapered lugs 17 of an interrupted circular series generally depending from an annular laterally extending flange 19 of the sheet metal thrust bearing or take up collar broadly denoted 20. In the form disclosed the diaphragm spring may be said to be corrugated undulatory. When the thrust bearing is positioned on the spring diaphragm, the inwardly turned or reflexed ends or terminals 21 defining an annular interrupted rim or contracted portion of the tapered lugs 17 are first received in opening 13, thus the lower diverged terminal portions of lugs 17 may be said to characterize the expanded portion of the annularly arranged interrupted series of depending lugs which are compressed or moved inwardly by the tapered but outwardly diverging wall of the conical opening 13, the latter being slightly smaller than the diameter of the widest or expanded peripheral portion of the depending series of lugs 18. Thereafter these terminals ultimately and automatically retract or shift outwardly to be confined in the radial concavities or tapered grooves 22 defined by the spaced ribs 10 in the underneath face of the diaphragm spring. Thus the spring lugs 17 of the thrust bearing interlock with the sides of the ribs of the diaphragm spring to prevent relative rotation. The upper portions of the ribs 10 and flange 19 of the collar also characterize complementary means to limit the insertion of the thrust bearing in the diaphragm spring. Where the thrust bearing is applied to the diaphragm S as shown in Fig. 3, the lugs 17 of the interrupted annular series of course are in interlocking relation with the sides of the spaced ribs and pressure applied to the annular flange 19 is transmitted to the flared ribs 10 to flex and tension the latter as required.

In actual practice where no thrust collar is employed, appreciable wear takes place at the upper part 12 of the spaced ribs 10 adjacent the contracted opening 13. By the present invention even though such wear exists, the diaphragm spring may be reconditioned by the application of the herein disclosed thrust bearings.

Various changes may be made in details of construction and arrangement of parts without departing from the spirit of the invention or sacrificing any of the advantages inherent therein.

I claim:

1. In combination, a substantially frusto-conical clutch diaphragm spring comprising a plurality of hollow undulatory radially arranged ribs presenting a plurality of spaced and radially disposed concavities in the underface of said spring and having a centrally arranged opening at one end thereof, and a thrust bearing embodying an annular laterally extending flange adapted to be seated on said ribs adjacent said opening and having an interrupted depending annular series of spaced and resilient lugs defining an annularly arranged interrupted expanded portion normally greater in size than said opening, said lugs adapted to be received in said opening for cooperating with the wall of the latter to contract said series and operative thereafter to automatically retract for positioning of said lugs in said concavities and interlock with the walls of the latter to prevent rotation of said bearing relative to said spring.

2. In combination, a substantially frusto-conical clutch diaphragm spring comprising a plurality of hollow undulatory radially arranged ribs presenting a plurality of spaced and radially disposed concavities in the underface of said spring and having a centrally arranged opening at one end thereof, and a thrust bearing embodying an annular laterally extending flange adapted to be seated on said ribs adjacent said opening and having an interrupted depending annular series of spaced and resilient lugs defining an annularly arranged interrupted expanded portion normally greater in size than said opening, said lugs adapted to be received in said opening for cooperating with the wall of the latter to contract said series and operative thereafter to automatically retract for positioning of said lugs in said concavities and interlock with the walls of the latter to prevent rotation of said bearing relative to said spring, said lugs having downwardly and inwardly extending terminal means defining an interrupted annular rim narrower in width than said interrupted expanded portion.

3. In combination, a substantially frusto-conical clutch diaphragm spring comprising a plurality of hollow undulatory radially arranged ribs presenting a plurality of spaced and radially disposed concavities in the underface of said spring and having a centrally arranged opening at one end thereof, and a thrust bearing embodying an annular laterally extending flange adapted to be seated on said ribs adjacent said opening and having an interrupted depending annular series of spaced and resilient lugs defining an annularly arranged interrupted expanded portion normally greater in size than said opening, said lugs adapted to be received in said opening for cooperating with the wall of the latter to contract said series and operative thereafter to automatically retract for positioning of said lugs in said concavities and interlock with the walls of the latter to prevent rotation of said bearing relative to said spring, said lugs having downwardly and inwardly extending terminal means defining an interrupted annular rim narrower in width than said interrupted expanded portion, said flange characterizing means cooperating with said ribs to limit the insertion of said bearing into said opening.

4. In combination, a substantially frusto-conical clutch diaphragm spring comprising a plurality of hollow undulatory radially arranged and tapered ribs presenting a plurality of spaced and radially disposed concavities in the underface of said spring and having a centrally arranged downwardly contracted and tapered opening at one end thereof, and a thrust bearing embodying an annular laterally extending flange adapted to be seated on said ribs adjacent said opening and having an interrupted depending annular series of spaced and resilient lugs defining an annularly arranged interrupted expanded portion normally greater in size than said opening, said lugs adapted to be received in said opening for cooperating with the wall of the latter to contract said series and operative thereafter to automatically retract for positioning of said lugs in said concavities and interlock with the walls of the latter to prevent rotation of said bearing relative to said spring, said lugs having downwardly and inwardly extending terminal means defining an interrupted annular rim smaller in size than said expanded portion, said flange cooperating with said ribs to limit insertion of said bearing into said opening.

5. A force receiving and force transmitting device for coacting with a hollow substantially frusto-conical clutch diaphragm spring having a plurality of radially arranged and spaced tapered parts having their narrowest portions defining a centrally arranged opening, said parts progressively increasing in width in a direction away from said opening; said device embodying a flange adapted to be seated on said narrowest portions and having an expandible and contractible and downwardly and outwardly extending annularly arranged series of spaced and resilient depending lugs having expanded portions, said series at its expanded portions being normally greater in size than the wall of said opening and adapted to be received therein to contract said series to permit the projection of the latter into said opening, said lugs adapted to interlock with said narrowest portions to prevent rotation of said force receiving and force transmitting device relative to said opening upon expansion of said series pursuant to the projection of the latter into said opening, said series having downwardly and inwardly extending terminals to facilitate insertion of said lugs into said opening.

6. A force receiving and force transmitting device for coacting with a hollow substantially frusto-conical clutch diaphragm spring having a plurality of radially arranged and spaced tapered parts having their narrowest portions defining a centrally arranged and tapered and downwardly contracted opening, said parts progressively increasing in width in a direction away from said opening; said device embodying an annular flange adapted to be seated on said narrowest portions adjacent said opening and having an expandible and contractible and downwardly and outwardly extending annularly arranged series of spaced and resilient depending lugs having expanded portions, said series at its expanded portions being normally greater in size than the wall of said opening and adapted to be received therein to contract said series to permit the projection of the latter into said opening, said lugs adapted to interlock with said narrowest portions to prevent rotation of said force receiving and force transmitting device relative to said opening upon expansion of said series pursuant to the projection of the latter into said opening, said series having downwardly and inwardly extending terminals to facilitate insertion of said lugs into said opening.

7. A force receiving and force transmitting device for coacting with a hollow substantially frusto-conical clutch diaphragm spring having a plurality of radially arranged and spaced tapered and hollow ribs having their narrowest portions defining a centrally arranged opening, said ribs progressively increasing in width in a direction away from said opening; said device embodying an annular flange adapted to be seated on said narrowest portions and having an expandible and contractible and downwardly and outwardly extending annularly arranged series of spaced and resilient depending lugs having expanded portions, said series at its expanded portions being normally greater in size than the wall of said opening and adapted to be received therein to contract said series to permit the projection of the latter into said opening, said lugs adapted to be received in said ribs and interlock with said narrowest portions to prevent rotation of said force receiving and force transmitting device relative to said opening upon expansion of said series pursuant to the projection of the latter into said opening, said series defining a downwardly and inwardly extending interrupted tapered rim to facilitate insertion of said lugs into said opening.

8. A force receiving and force transmitting device for coacting with a hollow substantially frusto-conical clutch diaphragm spring having a plurality of radially arranged and spaced tapered hollow ribs having their narrowest portions defining a centrally arranged opening, said ribs progressively increasing in width in a direction away from said opening; said device embodying an annular flange adapted to be seated on said narrowest portions and having an expandible and contractible and downwardly and outwardly extending annularly arranged series of spaced and resilient depending lugs having expanded portions, said series at its expanded portions being normally greater in size than the wall of said opening and adapted to be received therein to contract said series to permit the projection of the latter into said opening, said lugs adapted to be received in said ribs and interlock with said narrowest portions to prevent rotation of said force receiving and force transmitting device relative to said opening upon expansion of said series pursuant to the projection of the latter into said opening, said series having downwardly and inwardly extending terminals to facilitate insertion of said lugs into said opening.

9. A force receiving and force transmitting device for coacting with a hollow substantially frusto-conical clutch diaphragm spring having a plurality of radially arranged and spaced tapered hollow ribs having their narrowest portions defining a centrally arranged tapered and downwardly contracted opening, said ribs progressively increasing in width in a direction away from said opening; said device embodying an annular flange adapted to be seated on said narrowest portions and having an expandible and contractible and downwardly and outwardly extending annularly arranged series of spaced and resilient depending lugs having expanded portions, said series at its expanded portions being normally greater in size than the wall of said opening and adapted to be received therein to contract said series to permit the projection of the latter into said opening, said lugs adapted to be received in said ribs and interlock with said narrowest portions to prevent rotation of said force receiving and force transmitting device relative to said opening upon expansion of said series pursuant to the projection of the latter into said opening, said series having downwardly and inwardly extending terminals to facilitate insertion of said lugs into said opening, and said flange cooperating with said narrowest portions to limit projection of said device into said opening.

HAROLD GASS.